US012617548B2

(12) United States Patent
Guerra et al.

(10) Patent No.: US 12,617,548 B2
(45) Date of Patent: May 5, 2026

(54) AIRCRAFT WITH MOVING SYSTEM FOR MOVING SENSING MEANS DURING FLIGHT

(71) Applicant: LEONARDO S.P.A., Rome (IT)

(72) Inventors: Antonio Guerra, Cardito (IT);
Giuseppe Viglione, Qualiano (IT)

(73) Assignee: LEONARDO S.P.A., Rome (IT)

( * ) Notice: Subject to any disclaimer, the term of this patent is extended or adjusted under 35 U.S.C. 154(b) by 100 days.

(21) Appl. No.: 18/577,734

(22) PCT Filed: Sep. 26, 2022

(86) PCT No.: PCT/IB2022/059078
§ 371 (c)(1),
(2) Date: Jan. 9, 2024

(87) PCT Pub. No.: WO2023/047370
PCT Pub. Date: Mar. 3, 2023

(65) Prior Publication Data
US 2024/0217672 A1 Jul. 4, 2024

(30) Foreign Application Priority Data

Sep. 27, 2021 (IT) .......................... 10201000024629

(51) Int. Cl.
B64D 43/00 (2006.01)
B64D 47/08 (2006.01)
G03B 15/00 (2021.01)

(52) U.S. Cl.
CPC ........... B64D 43/00 (2013.01); G03B 15/006 (2013.01); B64D 47/08 (2013.01)

(58) Field of Classification Search
None
See application file for complete search history.

(56) References Cited

U.S. PATENT DOCUMENTS 6,978,513 B2 * 12/2005 Harlacker ............... E05F 5/003
16/86 A
7,387,276 B1 6/2008 Smith et al.
(Continued)

FOREIGN PATENT DOCUMENTS

DE 102004059802 A1 6/2006
FR 3051175 A1 11/2017

OTHER PUBLICATIONS

International Search Report, issued in PCT/IB2022/059078, mailed Jan. 9, 2023, Rijswijk, NL.

*Primary Examiner* — Todd Melton
(74) *Attorney, Agent, or Firm* — ArentFox Schiff LLP; Michael Fainberg

(57) ABSTRACT
An aircraft is provided that has a moving system for moving, during flight, sensors of the aircraft between a rest position in which the sensors are arranged within the aircraft, and a work position in which the sensors face directly, along a sensing direction, towards outside of the aircraft and towards the ground when the aircraft is in flight. The moving system has a frame arranged inside the aircraft, a slide supporting the sensors, and a pair of guides, each guide having a rail part supported on the frame, and at least one draw part arranged telescopically slidable relative to the relevant rail part along a direction of movement perpendicular to the sensing direction. The slide, mounted integrally with the draw parts of the pair of guides, slides along the direction of movement internally within the aircraft to move the sensors between the rest and work positions.

13 Claims, 7 Drawing Sheets

(56)          References Cited

U.S. PATENT DOCUMENTS

| | | | |
|---|---|---|---|
| 8,453,968 | B2 * | 6/2013 | Dias Ferraz ........... B64D 47/08 |
| | | | 244/129.1 |
| 8,807,482 | B2 * | 8/2014 | Woodland ................. B64C 1/18 |
| | | | 244/129.4 |
| 10,816,056 | B2 * | 10/2020 | Chang ................... B64D 47/08 |
| 10,969,256 | B2 * | 4/2021 | Parsons ................. B64D 43/00 |
| 2005/0029399 | A1 | 2/2005 | Lowe et al. |
| 2012/0261511 | A1 | 10/2012 | Ehlert et al. |

* cited by examiner

AIRCRAFT WITH MOVING SYSTEM FOR MOVING SENSING MEANS DURING FLIGHT

CROSS-REFERENCE TO RELATED APPLICATIONS

This application is a National Phase Application of PCT International Application No. PCT/IB2022/059078, having an International Filing Date of Sep. 26, 2022 which claims priority to Italian Application No. 102021000024629 filed Sep. 27, 2021, each of which is hereby incorporated by reference in its entirety.

TECHNICAL FIELD

The present invention relates to an aircraft comprising a moving system for moving sensing means of the aircraft, particularly for placing said sensing means at an opening and being able to turn them directly toward the outside of the aircraft when the aircraft is in flight.

PRIOR ART

In the field of aerial photography or reconnaissance by sensors, sensing means and/or cameras mounted on board an aircraft are used and directed so that, during flight, they point towards the ground in order to carry out the required surveys and reconnaissance. In particular, in airplanes equipped with a pressurized cabin which may be reconfigured for multi-mission purposes (e.g., maritime surveillance, transportation of cargo or products, transportation of personnel or passengers, search and rescue missions), the installation of sensing means or cameras is provided for remote sensing at altitude on an external surface of a fuselage facing the ground, or on an opening hatch, or on an opening window, so that the sensors or cameras may be exposed directly to the outside without the detection passing through glass, degrading the quality of the sensing signal which is for example optical or radio.

Indeed, the sensing means and cameras, due to their inherent characteristics of operation, need to be pointed directly at the ground, without any interference in the visible and non-visible range, such as refraction and/or reflection phenomena through the transparent parts of the aircraft (such as windows, etc.).

Airplanes, especially those for cargo, or which are at least partly assigned to transport cargo, often have cramped spaces and require distinctive, specific, and complex installations to be applied on the platforms that support the sensing means, or cameras. Indeed, in order to allow the sensor to exit the aircraft through a port during the unpressurized flight, a mechanical arm is used in many applications, which results in the use of space on the aircraft and has repercussions on the vibrational performance that need to be properly compensated for.

All this has major consequences on the reconfigurability and stowage of the equipment on which the sensing means are mounted after use.

The arrangements of sensors generally used in aircraft according to the prior art, such as the one just described, have several drawbacks.

First, the known arrangements require a large volume to move the sensors and therefore create a large footprint inside the aircraft. In particular, in the arrangements according to the prior art, when the use of the sensing means is no longer necessary, the area or bay in which the sensing means are arranged during use may still not be reused.

In addition, if the sensing signal from the sensing means is not able to reach the ground directly except by passing through a transparent part (such as a window or windowed hatch), the quality of the signal and consequently the sensing will be compromised, due to the aforementioned refraction and/or reflection problems.

SUMMARY OF THE INVENTION

The object of the present invention is to provide an aircraft with a moving system for moving sensing means that does not have the drawbacks of the prior art.

This and other objects are fully achieved according to the present invention by an aircraft as described and claimed herein.

Advantageous embodiments of the present invention are also described.

In short, the invention is based on the idea of providing an aircraft comprising:

a moving system adapted for use when the aircraft is in flight to move sensing means of the aircraft between a rest position, wherein the sensing means are arranged within the aircraft, and a work position, wherein the sensing means face directly, along a sensing direction, towards the outside of the aircraft and towards the ground when the aircraft is in flight, the moving system comprising:

a frame arranged inside the aircraft;

a slide, adapted to support said sensing means; and a pair of guides, each comprising a rail part supported on said frame, and at least one draw part, the draw part of each guide being arranged telescopically slidable relative to the relevant rail part along a direction of movement that is essentially perpendicular to said sensing direction;

the slide being mounted integrally with the draw parts of the pair of guides in such a way to slide along the direction of movement within the aircraft to move said sensing means between said rest position and said work position.

Advantageously, the moving system may further comprise drive means adapted to actuate the sliding movement of said slide along the direction of movement. Preferably, said drive means may comprise a handle which is arranged integrally with the slide and adapted to allow the manual movement of the slide and/or at least one actuator, preferably an electric actuator or a hydraulic actuator.

Preferably, moreover, the moving system may comprise an abutment element arranged so as to limit the sliding movement along the direction of movement of the slide, or so that the slide abuts the abutment element when the sensing means are in said work position.

Advantageously, the moving system may further comprise a ramp arranged integrally with the abutment element and facing towards said slide, and a caster mounted rotatably on a pin arranged on the slide, wherein the caster is adapted to come into contact with said ramp to facilitate or direct the sliding movement of the slide along the direction of movement.

Advantageously, moreover, the abutment element may have a tilted part which is adapted to cooperate with a draw part of a guide of the pair of guides, or with an edge of the slide, to guide the sliding movement of the slide along the direction of movement.

Preferably, the moving system may further comprise a plurality of dampers which are arranged on said slide, or arranged on said slide and interposed between said slide and the sensing means, and are adapted to dampen or limit the transmission of vibrations to the sensing means.

Preferably, the moving system may further comprise a blocking element which is arranged integrally with the abutment element and adapted to be arranged in a blocking configuration wherein it blocks the movement of the slide along the direction of movement.

Preferably, the aircraft according to an embodiment of the invention also comprises sensing means which are arranged on the slide of the moving system and integral thereto in the sliding movement along the direction of movement.

Preferably, the sensing means may comprise one or more among: optical sensors, a radar sensor, lidar sensors, remote sensing sensors, temperature sensors, Doppler-effect sensors, spectral sensors or hyperspectral sensors.

Finally, preferably, the aircraft or fixed-wing aircraft according to an embodiment of the invention further comprises a structure, such as a fuselage, having an opening which preferably faces the ground when the aircraft is in flight and is capable of connecting the interior and exterior of the aircraft, the opening being openable and closable by means of a hold door;

wherein in the work position the sensing means face directly towards the outside of the aircraft through said opening and the opening is open.

BRIEF DESCRIPTION OF THE DRAWINGS

The features and advantages of the present invention will be clarified by the detailed description that follows, given purely by way of non-limiting example and with reference to the attached drawings, in which.

DETAILED DESCRIPTION

Figure 1:
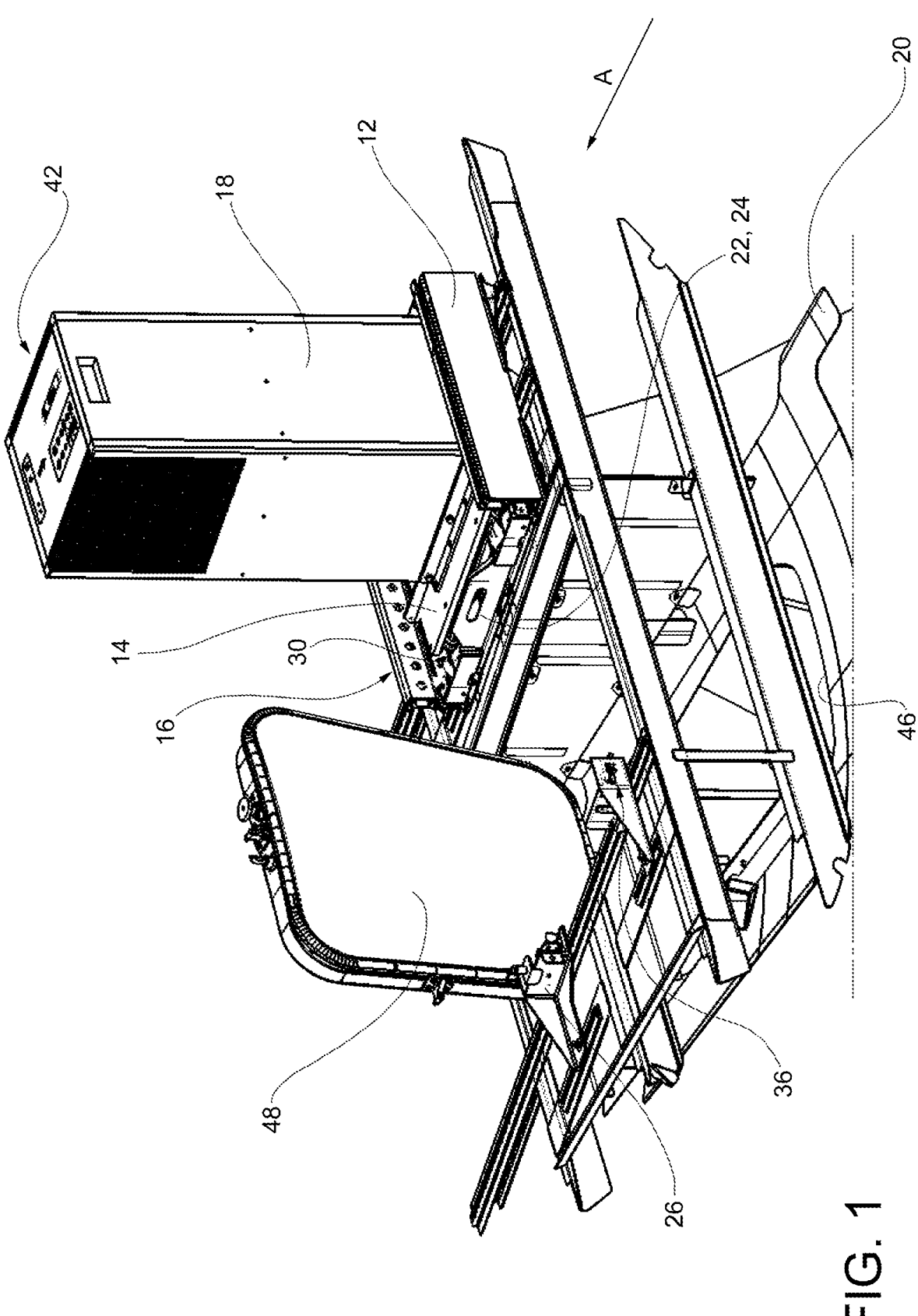
FIG. 1 is a perspective view of a moving system of an aircraft according to an embodiment of the invention, with the sensing means arranged in a first position, called the rest position.

With reference to the figures, in general, the aircraft according to the invention is generally indicated with 1. The aircraft (known per se, not fully shown in the figure but only the part relevant to the invention) comprises a sensing system 42, which in turn comprises a moving system 10 and sensing means 18. The moving system 10 is adapted for use when the aircraft 1 is in flight to move sensing means 18 of the aircraft between the two positions as defined above, or a rest position, in which the sensing means 18 are arranged or stowed inside the aircraft 1 or a structure 20 of the aircraft, such as, for example, a fuselage, and a work position, in which the sensing means 18 face directly, along a sensing direction y (described in more detail below), towards the outside of the aircraft 1 and towards the ground when the aircraft 1 is in flight.

The moving system 10 essentially comprises a frame 12, a slide 14 and a pair of guides 16.

The frame 12 is made in a manner known to the person skilled in the art, preferably of metal or composite material. The frame 12 is arranged internally to the aircraft 1, or it is arranged fixed with respect to the inner structure of the aircraft 1, e.g., it is attached thereto by conventional mechanical connection means, such as threaded mechanical connection means. As clearly visible in FIGS. 1 to 4, and in FIG. 6, the frame 12 may be made in the shape of a squared C and may have a pair of parallel parts 12a and 12b joined by a transverse part 12c. The component parts of the frame 12 may, for example, be made as lattice trusses.

Preferably, the frame 12 is made and appropriately sized so that it may be arranged in place of guides or sliding seat supports of the aircraft 1, for example, it is sized to occupy the same footprint in width as a seat or pair of adjacent seats. In this way, it is possible to easily and quickly reconvert, even temporarily, the interior space of the aircraft 1.

The guides 16 of the pair of guides 16 are preferably arranged parallel to each other and spaced apart. Preferably, each guide 16 is mounted on one of the parallel parts 12a and 12b of the frame 12. There is nothing to prevent the number of guides 16 from being different, as is evident to the person skilled in the art; for example, a pejorative but still feasible solution of the invention involves the use of only one guide 16. Alternatively, it is also possible to strengthen the moving system 10 according to the invention by using two pairs of guides 16 arranged two on one side and two on an opposite side of the frame 12. In the embodiment shown in the figures, the guides 16 are arranged below the slide 14 and support it from below, but it is also possible to arrange the guides 16 above the slide 14 and mount the slide 14 hanging or hooked onto the guides 16, without thereby departing from the scope of the invention.

Figure 6:
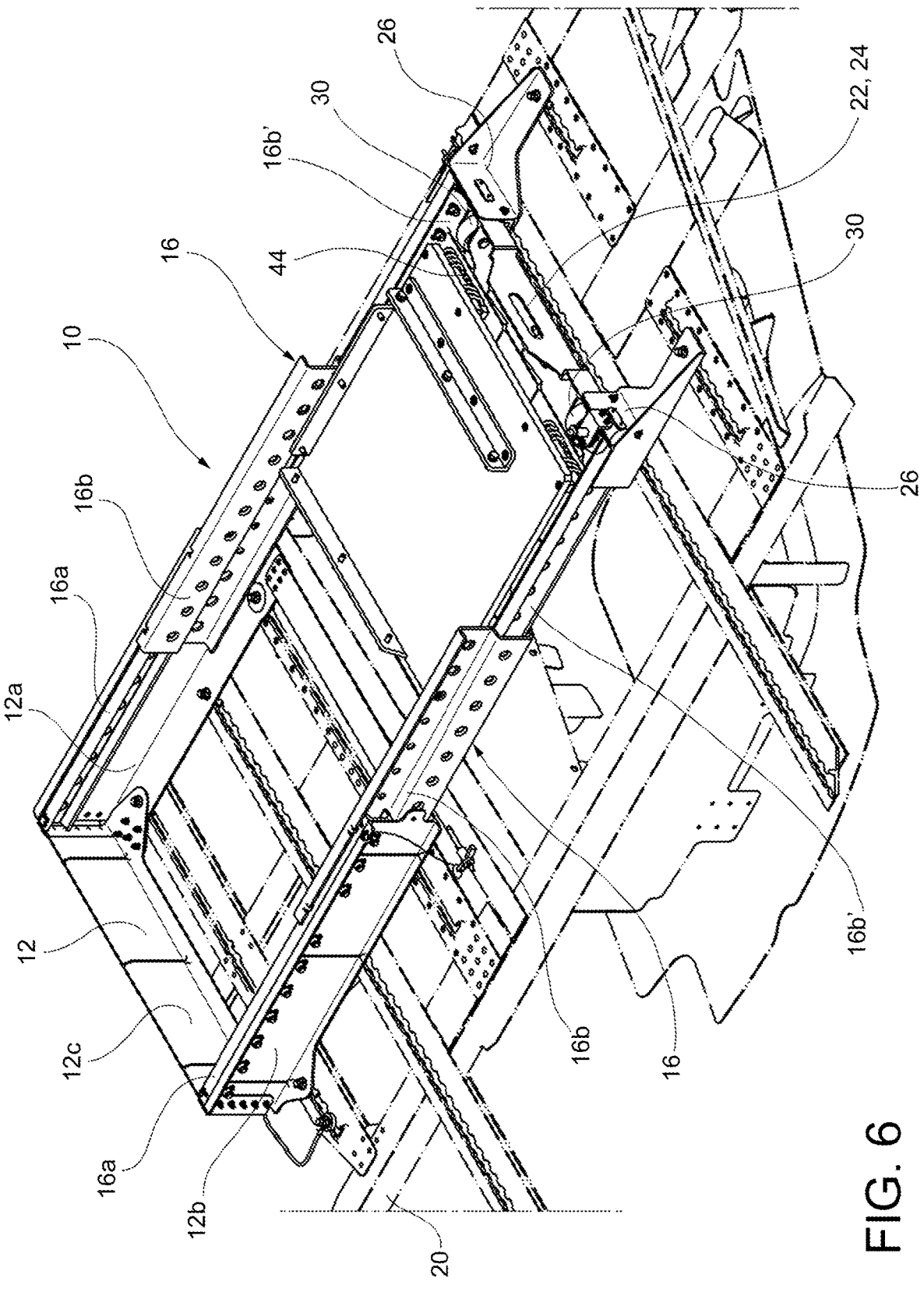
FIG. 6 is a perspective view of a moving system of FIG. 3, viewed from a further direction with respect to FIG. 1, with the sensing means arranged in the third position, or the work position, but not shown for simplicity.

In particular, as is clearly visible in FIG. 6, each of the guides 16 is made as a telescoping guide, or it has a fixed part and one or more draw parts, or arranged slidable one on top of the other, and the first of said draw parts is mounted slidable on the fixed part. According to the invention, each guide 16 comprises a rail part 16a and a draw part 16b, and the draw part 16b of each guide 16 is arranged slidable relative to the relevant rail part 16a along a direction of movement x, which is essentially perpendicular to said sensing direction y. It is clear to the person skilled in the art that the rail part 16a may be configured as a track guide or as a monorail guide. It is also clear to the person skilled in the art that a guide 16 used in the invention may also have a different number of additional draw parts 16b arranged slidable on a preceding draw part 16b. In the embodiment shown in FIGS. 1 to 3, each guide 16 has a rail part 16a arranged on one of the parallel parts 12a or 12b of the frame 12, a first draw part 16b mounted slidable on, and relative to, the rail part 16a, and a second draw part 16b' mounted slidable on, and relative to, the first draw part 16b.

Preferably, the relative sliding of the draw part(s) 16*b* and 16*b'* is facilitated by the provision of suitable anti-friction means, such as ball bearings interposed between the draw part(s) 16*b* and 16*b'* and the relevant guide part 16 on which they slide, or an additional draw part 16*b* or the rail part 16*a*.

The slide 14 is adapted to support the sensing means 18. In the example embodiment shown in FIGS. 1 to 3, the slide 14 is made as a drawer, or as a supporting surface in the form of a slidably mounted plate. The slide 14 is mounted so that it may slide relative to the frame 12 along said direction of movement x inside the aircraft 1 to move the sensing means 18 which it carries between the rest position and the work position. Specifically, for this purpose, the slide 14 is mounted integral to the draw parts 16*b* of the guides 16, or it is mounted integral on the last of the draw parts 16*b* of each guide 16, so that when each telescopic guide 16 is fully pulled out, the slide 14 is brought to a position of maximum distance from the frame 12.

To enable the translation movement of the slide 14 adapted to bring the sensing means 18 between the rest position and the work position, the moving system 10 preferably further comprises drive means 22 adapted to actuate said movement along the direction of movement x. Specifically, the drive means 22 may comprise a handle 24, or a hollowed-out or lowered part, arranged integral to the slide 14, to allow an operator to pull or push the slide 14 manually along the direction of movement x. The drive means 22 may also comprise at least one actuator (not shown, known per se), for example a hydraulic actuator, an electric actuator, or a pneumatic actuator, to enable the movement of the slide 14 along the direction of movement x to be controlled in a motorized and/or automated manner. In a preferred embodiment, the drive means 22 may comprise both a handle 24 and at least one actuator, so as to achieve functional redundancy. Preferably, when present, the at least one actuator is remotely controllable through control means, such as through a button arranged in a cockpit of the aircraft.

Figure 7:
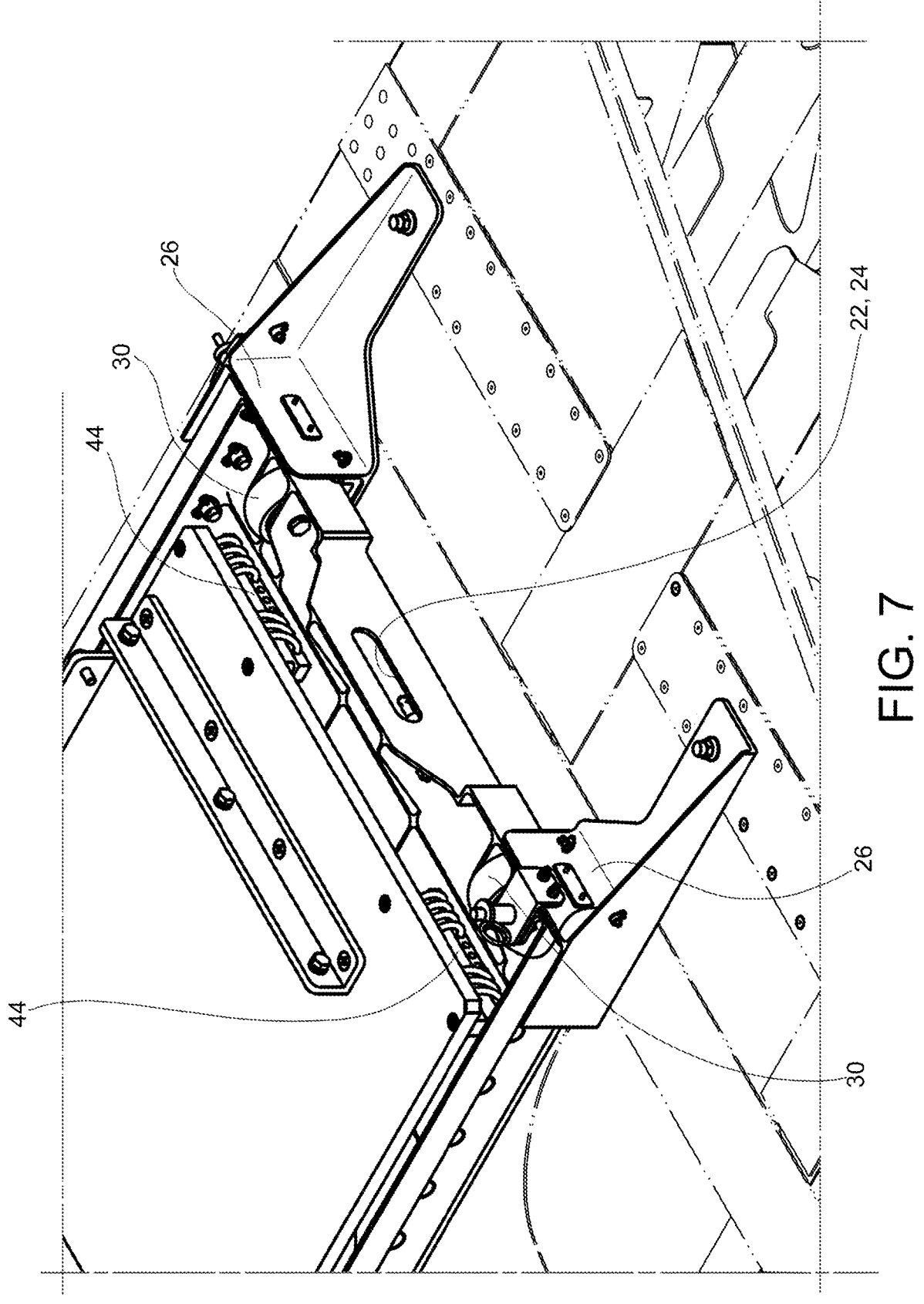
FIG. 7 is a detail view of a portion of FIG. 6.

As is particularly visible in FIG. 7, the moving system 10 according to a preferred embodiment of the invention further comprises an abutment element 26. The abutment element 26 is arranged in such a way as to limit the sliding motion of the slide 14 along the direction of movement x, for example by providing a stop or striker surface against which the slide 14 abuts when the sensing means 18 have been brought into the work position. Alternatively, the abutment element 26 may consist of a plurality of striking surfaces, for example a plurality of small cylinders or walls arranged aligned with each other.

Figure 2:
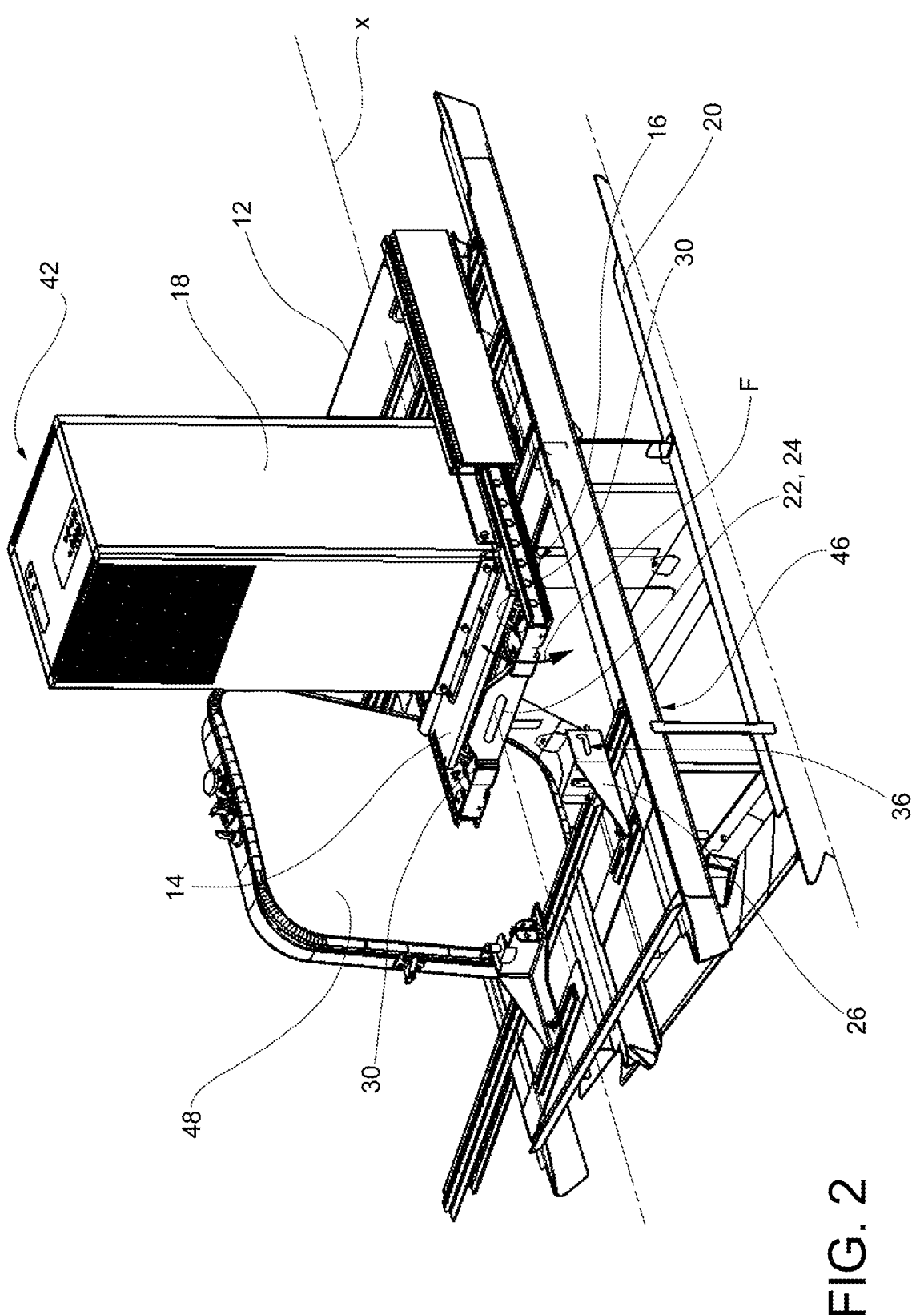
FIG. 2 is a perspective view of a moving system of FIG. 1, with the sensing means arranged in a second position which is intermediate between said rest position and a work position.
Figure 3:
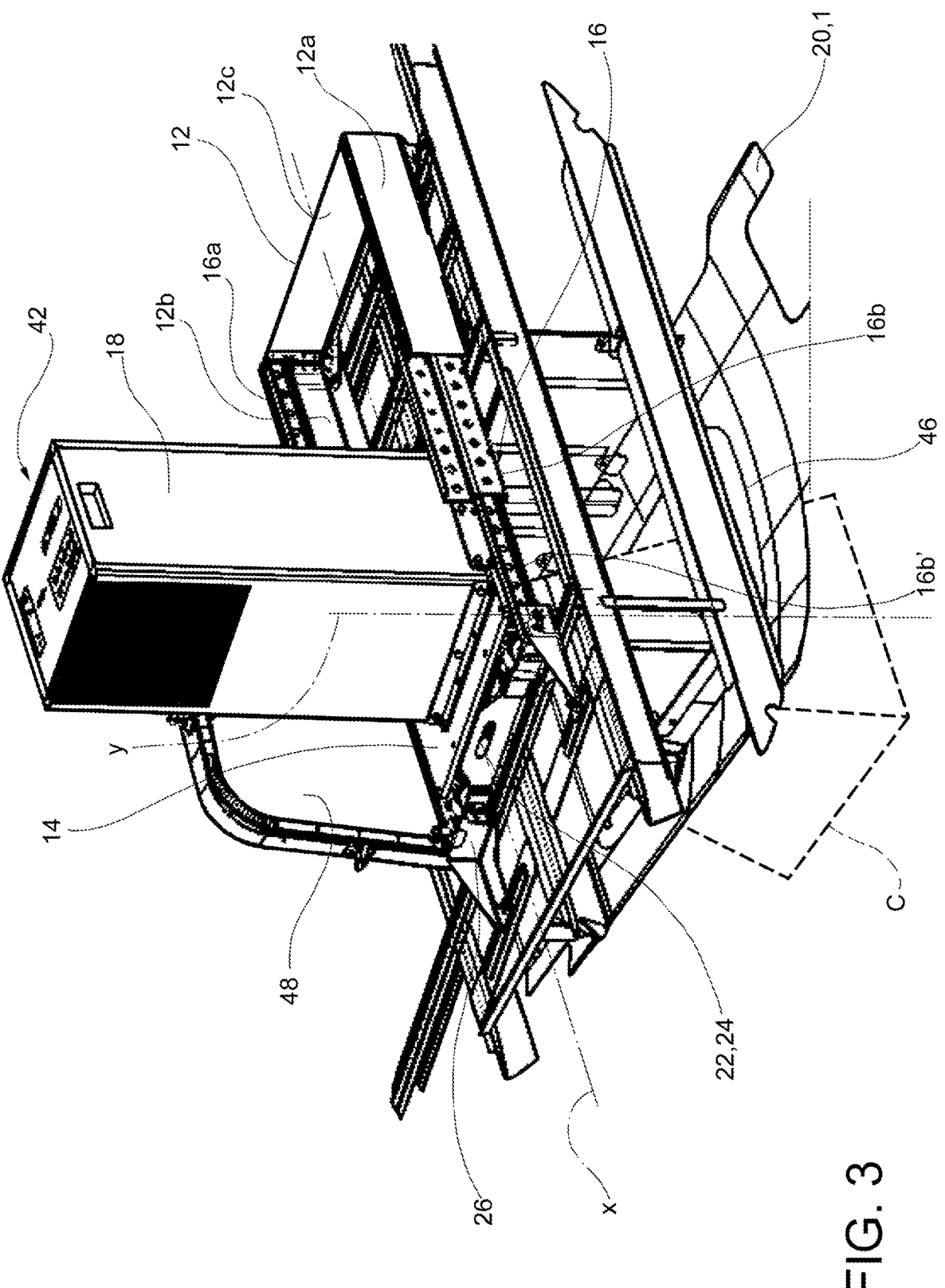
FIG. 3 is a perspective view of a moving system of FIG. 1, with the sensing means arranged in a third position, namely the work position.

As may be seen in FIGS. 1 to 3, and in FIG. 7 in detail, the abutment element 26 may, for example, be made by means of two small walls which are arranged on two opposite sides in such a way as to define two abutment surfaces against which one edge of the slide 14 abuts, and which are fixed in place by conventional mechanical means of connection known to the person skilled in the art.

Advantageously, the moving system 10 further comprises a ramp 28 and a caster 30, which are adapted to cooperate with each other to facilitate the sliding movement of the slide 14 along the direction of movement x.

For this purpose, the ramp 28 is arranged integral with the abutment element 26 or otherwise integral with the internal structure of the aircraft, and is mounted facing the slide 14. The caster 30, on the other hand, is rotatably mounted on a pin 32, which is arranged on the slide 14.

In fact, as the slide 14 carries the sensing means 18 in its movement as the slide 14 is moved along the direction of movement x, and the sensing means 18 move away from the frame 12, or the rest position, and closer to the work position, the weight of the sensing means 18 may cause it to bend (directed downward, in FIGS. 2 and 3—and stylized with the arrow F in FIG. 2 and the bottom part of FIG. 4), which risks preventing the slide 14 from completing its movement along the direction of movement x.

Figure 4:
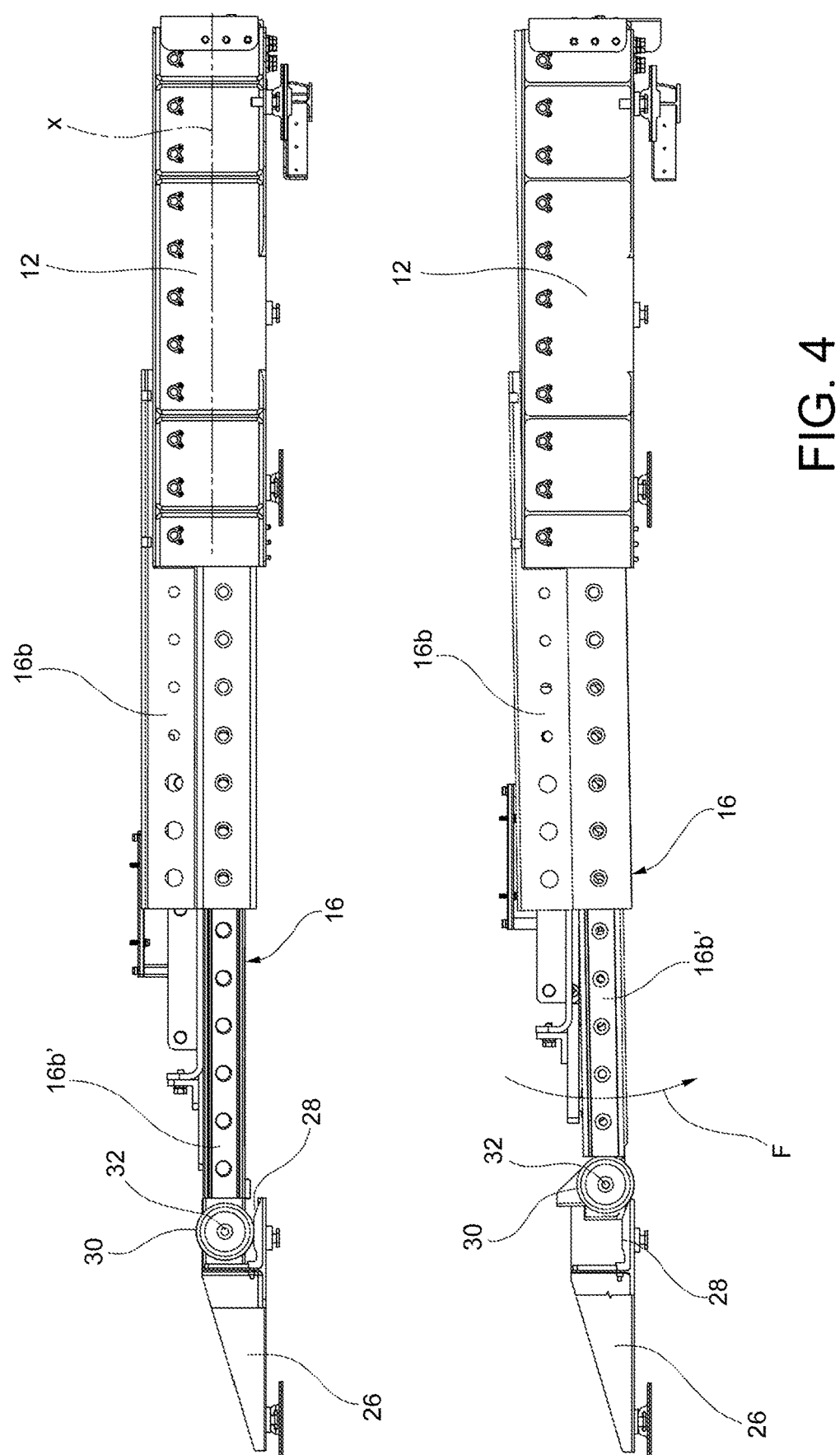
FIG. 4 is a detail view in lateral cross section, on a first plane parallel to a direction of movement and viewed from the direction shown with the arrow A in FIG. 1, of some components of the moving system of FIG. 1, shown in two different work positions.

Thus, as shown in the bottom part of FIG. 4, when the slide 14, moving away from the frame 12, is approaching the abutment element 26, the caster 30 makes contact with the tilted surface of the ramp 28 and allows the routing of the slide 14 and thus facilitates the remaining part moving along the direction of movement x, shown in the top part of FIG. 4.

Clearly, the relative arrangements of the caster 30 and ramp 28 may also be reversed without departing from the scope of the invention.

The ramp 28 is preferably made of, or its surface is covered with, a material with a low or very low friction coefficient, such as polytetrafluoroethylene.

Clearly, the ramp 28 may also be equivalently replaced by a curved structure, or which has a curved surface, for example in the shape of a duckbill, and is in any case made in such a way as to facilitate the ascent of the caster 30 on its surface.

In the preferred embodiment shown in the figures, the moving system 10 comprises a pair of casters 30 and a pair of ramps 28 as described above, arranged at opposite sides with respect to a centerline of the sensing means parallel to the direction of movement x, each of the casters 30 being adapted to cooperate with a relevant ramp 28 of the pair of ramps.

Finally, as is clear to the person skilled in the art, moreover, further mechanisms not explicitly described here but known to the person skilled in the art may also be implemented for the purpose of facilitating, or directing, the movement of the slide 14 along the direction of movement x.

Preferably, moreover, the abutment element 26 may have a tilted part 34 to further facilitate the routing of the movement of the slide 14 along the direction of movement x. In particular, the tilted part 34 may be configured to cooperate with a draw part 16*b* of one of the guides 16, or with an edge of the slide 14 so as to guide the sliding movement of the slide 14 along the direction of movement x.

Figure 5:
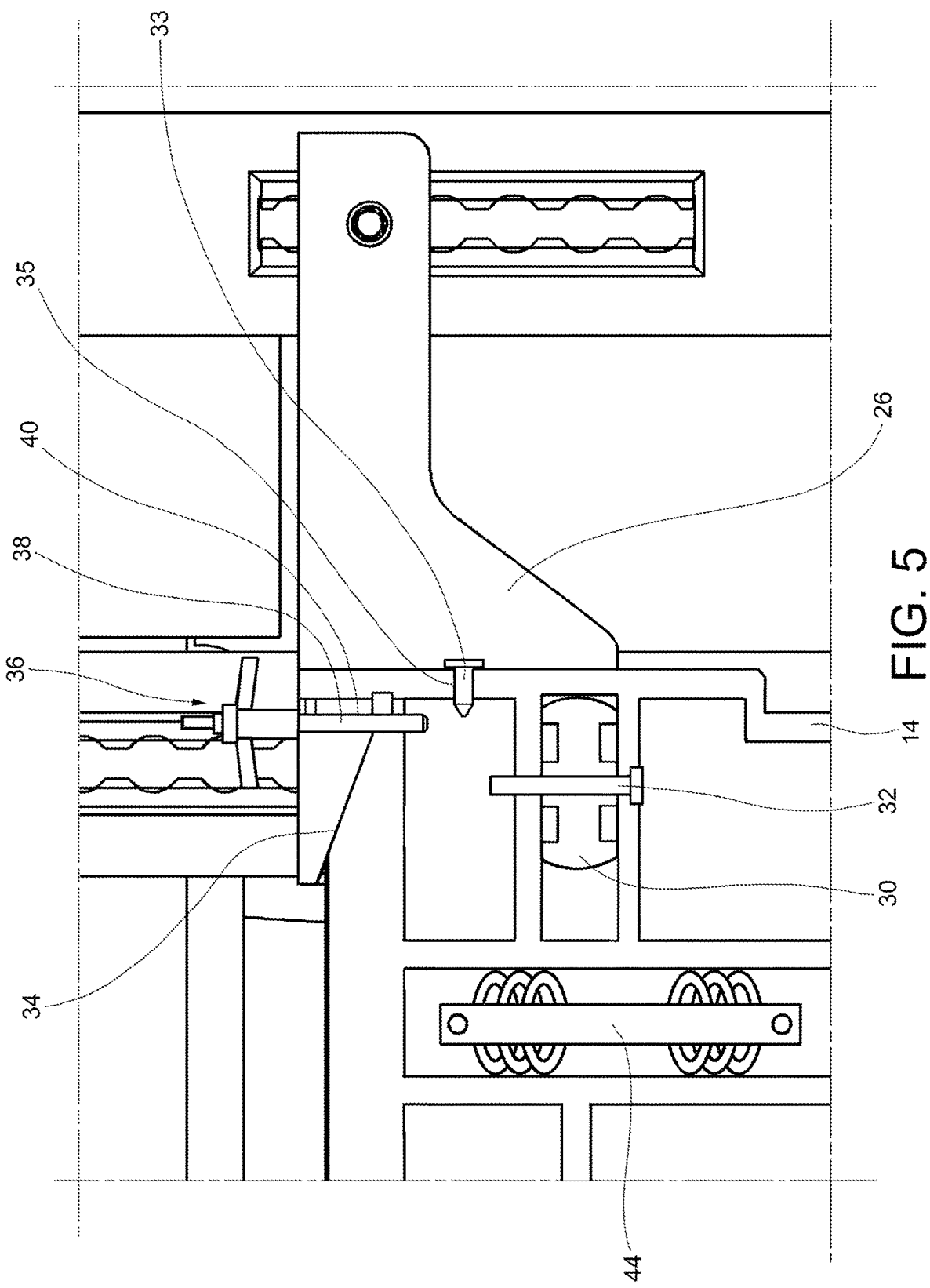
FIG. 5 is a detail view in cross section, on a second plane parallel to the direction of movement and perpendicular to the first plane, of some components of the moving system of FIG. 1.

Preferably, moreover, the moving system 10 comprises at least one blocking element 36 which is arranged integral with the abutment element 26 and adapted to be arranged in a blocking configuration where it blocks the movement of the slide 14 along the direction of movement x. As shown in FIG. 5, in a purely illustrative and non-limiting embodiment, the blocking element 36 may comprise a pin 38 that may be placed within a corresponding hole 40 made in a side edge of the slide 14 and/or on the draw part 16*b* of one of the guides 16. Alternatively, the blocking element 36 may be made as a hook or other conventional configuration.

As shown in FIG. 5, the moving system 10 may also comprise a directional pin 33, which is adapted to cooperate with a corresponding hole 35 made in an edge of the slide 14 and/or on the draw part 16*b* of one of the guides 16.

As mentioned above, the moving system 10 may be used in a sensing system 42. The sensing system 42 comprises, in addition to the moving system 10 according to any of the above-described embodiments, sensing means 18 arranged on the slide 14 so as to be integral there-with in the sliding movement along the direction of movement x. Preferably, a plurality of dampers 44 is arranged on the slide 14, and interposed between the slide 14 and the sensing means 18. Said dampers 44 are adapted to dampen the vibrations transmitted to the sensing means 18 so as to improve the stability of the positioning of the sensing means 18 and consequently the quality of sensing of the sensing means 18. The person skilled in the art will be able to select appropriate dampers 44 depending on the load, or the vibrations transmitted to the slide 14 and, therefore, to the sensing means 18, as well as the type of aircraft and the type of mission.

The sensing means 18 are generally facing downward in FIGS. 1, 2 and 3, or towards the ground when the aircraft is in flight, thus defining the sensing direction y mentioned above. The sensing means 18 may comprise at least one of: video cameras, cameras, optical sensors, a radar sensor, lidar sensors, remote sensing sensors, temperature sensors, Doppler-effect sensors, spectral sensors or hyperspectral sensors. Essentially, therefore, the sensing direction y of the sensing means 18 is the direction towards which the emission of the sensing means 18 is oriented, for example the direction towards which the laser is oriented, if the sensing means 18 are comprised of laser sensors, or the direction towards which the lens is oriented, if the sensing means 18 are comprised of a camera, and so on. In any case, the sensing means 18 may comprise any type of sensor that is useful for conducting remote sensing at altitude from aircraft and adapted to withstand the displacements resulting from moving the slide 14 along the direction of movement x.

As mentioned above, the sensing system 42 may be mounted on the aircraft 1 according to the invention, or a fixed-wing aircraft, preferably an airplane. As mentioned above, the aircraft has a structure 20, such as a fuselage, which is preferably pressurizable, and in which an opening 46 is defined. The opening 46 is intended to connect the interior and exterior of the aircraft or structure 20 of the aircraft. The opening 46 may be closed and opened by a hold door 48, for example a hold door 48 mounted so as to be hinged and pivotable along one of its side edges. By virtue of the moving system 10, the sensing means 18 of the sensing system 42 may then be moved between the rest position and the work position, in which they face directly towards the outside of the aircraft. In a mode of use, or in a flight phase, preferably at low altitude, in which the aircraft's mission involves a remote sensing operation by the sensing means 18, the hold door 48 is brought into an open configuration and the opening 46 is therefore open. At this point, an operator may use the drive means 22, such as the handle 24, to move the slide 14, and consequently the sensing means 18 attached thereto, to the work position, or to bring the slide 14 to the open opening 46 and thus position the sensing means 18 to face directly towards the outside of the aircraft. The sensing signal, which, as mentioned above, defines the sensing direction y, of the sensing means 18 may then pass freely through the open opening 46 without having to penetrate any means, not even a transparent means such as a glass or window, and define a detection cone C (shown with dashed lines in FIG. 3).

As may be seen from the preceding description, by virtue of the moving system of the aircraft according to the invention, the objects of the above-described invention may be fully achieved, resulting in several advantages.

First of all, with said moving system, sensing means may be easily moved on an aircraft, while still ensuring that the moving system has the smallest possible footprint inside the aircraft and is easy to implement.

Furthermore, by virtue of the possibility of sizing the moving system and the sensing system all according to the lateral footprint of one or more seats, it is possible to use the same space occupied by one or more seats, easily reconfiguring it by mounting said sensing system in place of the one or more seats.

Finally, by virtue of the configuration of the aircraft, it is possible to place the sensing means in such a way that a sensing signal therefrom may be disseminated to the ground and to the aircraft's external environment without having to pass through means, even transparent means, such as windows or glass, and therefore without having to tolerate degradation or reduction in signal quality.

Without prejudice to the principle of the invention, the embodiments and the details of construction may vary widely with respect to that which has been described and illustrated purely by way of non-limiting example, without thereby departing from the scope of protection of the invention as defined in the appended claims.

The invention claimed is:

1. An aircraft comprising:
   a moving system adapted for use when the aircraft is in flight to move sensing means of the aircraft between a rest position, wherein the sensing means are arranged inside the aircraft, and a work position, wherein the sensing means face directly, along a sensing direction, toward an outside of the aircraft and toward the ground when the aircraft is in flight, the moving system comprising:
   a frame arranged inside the aircraft;
   a slide, adapted to support said sensing means; and
   a pair of guides, each guide of the pair of guides comprising a rail part supported on said frame, and at least one draw part, the at least one draw part of each guide being arranged telescopically slidable relative to the respective rail part along a direction of movement essentially perpendicular to said sensing direction;
   the slide being mounted integrally with the draw parts of the pair of guides in such a way to slide along the direction of movement inside the aircraft to move said sensing means between said rest position and said work position.

2. The aircraft of claim 1, wherein the moving system further comprises drive means adapted to drive a sliding movement of said slide along the direction of movement.

3. The aircraft of claim 2, wherein the drive means comprise a handle, arranged integrally with the slide, and adapted to allow manual drive of the slide.

4. The aircraft of claim 2, wherein the drive means comprise at least one actuator.

5. The aircraft of claim 4, wherein the at least one actuator is an electric actuator or a hydraulic actuator.

6. The aircraft of claim 1, wherein the moving system further comprises an abutment element arranged in such a way to limit a sliding movement along the direction of movement of the slide, or in such a way that the slide goes into abutment against the abutment element when the sensing means are in said work position.

7. The aircraft of claim 6, wherein the moving system further comprises a ramp arranged integrally with the abutment element and facing towards said slide, and a caster mounted rotatably on a pin arranged on the slide, and wherein the caster is adapted to come into contact with said ramp to facilitate or direct the sliding movement of the slide along the direction of movement.

8. The aircraft of claim 6, wherein the abutment element has a tilted part adapted to cooperate with the at least one draw part of a guide of the pair of guides, or with an edge of the slide, to guide the sliding movement of the slide along the direction of movement.

9. The aircraft of claim 6, wherein the moving system further comprises a blocking element arranged integrally with the abutment element, and adapted to be arranged in a blocking configuration wherein the blocking element blocks the sliding movement of the slide along the direction of movement.

10. The aircraft of claim 1, wherein the moving system further comprises a plurality of dampeners, arranged on said slide and adapted to dampen transmission of vibrations to said sensing means.

11. The aircraft of claim 1, further comprising sensing means arranged on said slide and integral thereto in a sliding movement along the direction of movement.

12. The aircraft of claim 11, wherein the sensing means comprise at least one among: optical sensors, a radar sensor, lidar sensors, remote sensing sensors, temperature sensors, Doppler-effect sensors, spectral sensors or hyperspectral sensors.

13. The aircraft of claim 11, further comprising:

a structure having an opening adapted to put the inside and the outside of the aircraft in communication, the opening being openable and closable by a hold door;

wherein in the work position the sensing means face directly toward the outside of the aircraft by said opening, and the opening is open.

\* \* \* \* \*